United States Patent
Zhang et al.

(10) Patent No.: US 11,546,904 B2
(45) Date of Patent: Jan. 3, 2023

(54) METHODS AND APPARATUSES FOR AT LEAST REDUCING AN IMAGE INTERFERENCE FOR UPLINK TRANSMISSION

(71) Applicant: Telefonaktiebolaget LM Ericsson (publ), Stockholm (SE)

(72) Inventors: Chunhui Zhang, Stockholm (SE); Anders K. Eriksson, Uppsala (SE); Anders Wallén, Ystad (SE); Johan Bergman, Stockholm (SE); Gerardo Agni Medina Acosta, Märsta (SE); Christian Bergljung, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 34 days.

(21) Appl. No.: 17/044,118

(22) PCT Filed: Mar. 26, 2019

(86) PCT No.: PCT/SE2019/050268
§ 371 (c)(1),
(2) Date: Sep. 30, 2020

(87) PCT Pub. No.: WO2019/194723
PCT Pub. Date: Oct. 10, 2019

(65) Prior Publication Data
US 2021/0022141 A1    Jan. 21, 2021

Related U.S. Application Data

(60) Provisional application No. 62/654,259, filed on Apr. 9, 2018.

(51) Int. Cl.
*H04W 72/04*    (2009.01)
*G16Y 10/75*    (2020.01)
(Continued)

(52) U.S. Cl.
CPC ......... *H04W 72/0453* (2013.01); *G16Y 10/75* (2020.01); *H04L 41/0803* (2013.01); *H04W 72/082* (2013.01); *H04W 88/02* (2013.01)

(58) Field of Classification Search
CPC ........... H04W 72/0453; H04W 72/082; H04W 88/02; G16Y 10/75; H04L 41/0803
See application file for complete search history.

(56) References Cited

U.S. PATENT DOCUMENTS

| 2015/0146640 A1* | 5/2015 | Baldemair | .......... H04L 27/2647 370/329 |
| 2016/0143002 A1* | 5/2016 | Lindoff | ................. H04W 72/04 455/450 |

(Continued)

FOREIGN PATENT DOCUMENTS

WO    2017117812 A1    7/2017

OTHER PUBLICATIONS

3GPP TS 36.213 V14.5.0 (Year: 2018).*
(Continued)

*Primary Examiner* — Un C Cho
*Assistant Examiner* — Yu-Wen Chang
(74) *Attorney, Agent, or Firm* — Christopher & Weisberg, P.A.

(57) ABSTRACT

Methods and apparatuses are disclosed for reducing image interference in uplink transmission. In one embodiment, a wireless device (WD) is configured to receive an indication of a resource allocation from the network node; determine an uplink center frequency based at least in part on a center frequency of a resource allocated by the received indication of the resource allocation; and transmit uplink information according to the determined uplink center frequency.

19 Claims, 15 Drawing Sheets

(51) Int. Cl.
*H04L 41/0803* (2022.01)
*H04W 72/08* (2009.01)
*H04W 88/02* (2009.01)

(56) References Cited

U.S. PATENT DOCUMENTS

| | | | |
|---|---|---|---|
| 2017/0238292 A1* | 8/2017 | Rico Alvarino | H04W 48/12 |
| | | | 370/329 |
| 2018/0049201 A1 | 2/2018 | Hussain et al. | |
| 2018/0176848 A1* | 6/2018 | Tabet | H04W 36/36 |
| 2018/0176919 A1* | 6/2018 | Takahashi | H04W 56/0005 |
| 2018/0317185 A1 | 11/2018 | Chen et al. | |
| 2019/0069302 A1* | 2/2019 | Kumar | H04W 4/02 |
| 2020/0163056 A1* | 5/2020 | Li | H04W 48/12 |
| 2020/0187256 A1* | 6/2020 | Lim | H04W 74/0833 |
| 2021/0100023 A1* | 4/2021 | Wei | H04W 72/14 |

OTHER PUBLICATIONS

International Search Report dated Jun. 5, 2019 for International Application No. PCT/SE2019/050268 filed on Mar. 29, 2019, consisting of 12-pages.

3GPP TS 36.101 V15.2.0 3rd Generation Partnership Project; Technical Specification Group Radio Access Network; Evolved Universal Terrestrial Radio Access (E-UTRA); User Equipment (UE) radio transmission and reception (Release 15); Mar. 2018, consisting of 1625-pages.

\* cited by examiner

METHODS AND APPARATUSES FOR AT LEAST REDUCING AN IMAGE INTERFERENCE FOR UPLINK TRANSMISSION

CROSS-REFERENCE TO RELATED APPLICATIONS

This application is a Submission Under 35 U.S.C. § 371 for U.S. National Stage Patent Application of International Application No.: PCT/SE2019/050268, filed Mar. 26, 2019 entitled "METHODS AND APPARATUSES FOR AT LEAST REDUCING AN IMAGE INTERFERENCE FOR UPLINK TRANSMISSION," which claims priority to U.S. Provisional Application No. 62/654,259, filed Apr. 6, 2018, entitled "METHODS AND APPARATUSES FOR AT LEAST REDUCING AN IMAGE INTERFERENCE FOR UPLINK TRANSMISSION," the entireties of both of which are incorporated herein by reference.

TECHNICAL FIELD

The present disclosure relates to wireless communications, and in particular, to methods and apparatuses for at least reducing an image interference for uplink transmissions.

BACKGROUND

Bandwidth reduced Low complexity/Coverage Enhancement (BL/CE) has been considered for some wireless communications and, in particular for e.g. Machine-type (MTC) wireless communications. FIG. 1 illustrates example resource configurations associated with BL/CE.

In some scenarios, an issue may arise with in-phase and quadrature (IQ) image interference. Specifically, in some cases, due to the impairment of the radio frequency (RF) front end, the IQ imbalance (also referred to as IQ mismatch) may generate an image product of its own transmission and hence result in limited image rejection performance. The image product level may be required to be controlled in certain levels to prevent too much interfering on the other user associated with the receiving network node or base station (e.g., eNB). FIG. 2 illustrates an example of a user equipment (UE) or wireless device (WD)1 image interface to wireless device 2 (WD2) in an example scenario.

One problem with existing solutions may be that, for some MTC devices with limited transmission bandwidth, when deployed in a cell with a larger bandwidth (e.g., as compared to the limited transmission bandwidth of the MTC device), the MTC device's center frequency may not be aligned with the cell center frequency. One potential problem may be that several image products may be generated and interference super-posed to one WD could be so high as to disturb the other WDs associated with the receiving network node or base station (e.g., eNB).

For example, FIG. 3 shows that the center frequencies of the WD1 and WD2 are not aligned. Thus, in the example, WD1 and WD2 may generate their own image which may overlap at the resource position where WD3 is scheduled. Thus, with a flexible MTC WD center frequency position, there could be multiple image interference problem which may degrade the system performance.

SUMMARY

Some embodiments advantageously provide methods and apparatuses for preventing and/or at least reducing overlapping IQ images from different MTC-type WDs (e.g., Cat-M WDs). Some embodiments advantageously specify that when the WD uses "flexible PUSCH resource allocation", the WD may use the center of such allocation as the center frequency, thus avoiding IQ images on the other WDs in at least some cases.

Some advantages that may be provided by some embodiments of the disclosure include that the MTC WD will not generate multiple image problems with a flexible center frequency and thus system performance can be improved over existing arrangements.

According to one aspect, a wireless device, WD, configured to communicate with a network node is provided. The WD comprises processing circuitry configured to receive an indication of a resource allocation from the network node; determine an uplink center frequency based at least in part on a center frequency of a resource allocated by the received indication of the resource allocation; and transmit uplink information according to the determined uplink center frequency.

In some embodiments of this aspect, the WD is a narrowband-Internet of Things, NB-IoT, device. In some embodiments of this aspect, the resource allocation corresponds to a narrowband allocation. In some embodiments of this aspect, the resource is a resource block corresponding to an uplink channel. In some embodiments of this aspect, at least one of the indication of the resource allocation is a Resource Indication Value, RIV. In some embodiments of this aspect, the processing circuitry is further configured to determine the uplink center frequency based at least in part on the center frequency of the resource allocated by the received indication of the resource allocation by being further configured to: determine whether the center frequency of the resource is outside of an allowed center frequency range; if the center frequency of the resource is not outside of the allowed center frequency range, configure the uplink center frequency to be the center frequency of the resource; and if the center frequency of the resource is outside of the allowed center frequency range, configure the uplink center frequency to be an edge of the allowed center frequency range. In some embodiments of this aspect, the processing circuitry is further configured to determine the uplink center frequency based at least in part on the center frequency of the resource allocated by the received indication of the resource allocation by being further configured to: determine at least one possible center frequency based on a hardware capability of the WD; determine whether the center frequency of the resource is outside of an allowed center frequency range; if the center frequency of the resource is not outside of the allowed center frequency range, configure the uplink center frequency to be a nearest one of the determined at least one possible center frequency to the center frequency of the resource; and if the center frequency of the resource is outside of the allowed center frequency range, configure the uplink center frequency to be a nearest one of the determined at least one possible center frequency to an edge of the allowed center frequency range. In some embodiments of this aspect, the allowed center frequency range is one of a cell channel bandwidth range and a cell transmission bandwidth configuration range.

According to another aspect, a method in a wireless device, WD, is provided. The method comprises receiving an indication of a resource allocation from a network node; determining an uplink center frequency based at least in part on a center frequency of a resource allocated by the received indication of the resource allocation; and transmitting uplink information according to the determined uplink center frequency.

In some embodiments of this aspect, the WD is a narrowband-Internet of Things, NB-IoT, device. In some embodiments of this aspect, the resource allocation corresponds to a narrowband allocation. In some embodiments of this aspect, the resource is a resource block corresponding to an uplink channel. In some embodiments of this aspect, at least one of the indication of the resource allocation is a Resource Indication Value, RIV. In some embodiments of this aspect, the determining the uplink center frequency based at least in part on the center frequency of the resource allocated by the received indication of the resource allocation further comprises: determining whether the center frequency of the resource is outside of an allowed center frequency range; if the center frequency of the resource is not outside of the allowed center frequency range, configuring the uplink center frequency to be the center frequency of the resource; and if the center frequency of the resource is outside of the allowed center frequency range, configuring the uplink center frequency to be an edge of the allowed center frequency range. In some embodiments of this aspect, the determining the uplink center frequency based at least in part on the center frequency of the resource allocated by the received indication of the resource allocation further comprises: determining at least one possible center frequency based on a hardware capability of the WD; determining whether the center frequency of the resource is outside of an allowed center frequency range; if the center frequency of the resource is not outside of the allowed center frequency range, configuring the uplink center frequency to be a nearest one of the determined at least one possible center frequency to the center frequency of the resource; and if the center frequency of the resource is outside of the allowed center frequency range, configuring the uplink center frequency to be a nearest one of the determined at least one possible center frequency to an edge of the allowed center frequency range. In some embodiments of this aspect, the allowed center frequency range is one of a cell channel bandwidth range and a cell transmission bandwidth configuration range.

According to yet another aspect, a network node configured to communicate with a wireless device, WD, is provided. The network node comprises processing circuitry configured to: configure the WD by transmitting an indication of a resource allocation to the WD; and receive, from the WD, an uplink communication having a center frequency, the center frequency of the uplink communication based at least in part on a center frequency of a resource allocated by the transmitted indication of the resource allocation.

In some embodiments of this aspect, the WD is a narrowband-Internet of Things, NB-IoT, device. In some embodiments of this aspect, the resource allocation corresponds to a narrowband allocation. In some embodiments of this aspect, the resource is a resource block corresponding to an uplink channel. In some embodiments of this aspect, at least one of the indication of the resource allocation is a Resource Indication Value, RIV. In some embodiments of this aspect, the center frequency of the uplink communication is further based at least in part on an allowed center frequency range. In some embodiments of this aspect, the allowed center frequency range is one of a cell channel bandwidth range and a cell transmission bandwidth configuration range. In some embodiments of this aspect, the center frequency of the uplink communication is further based at least in part on a hardware capability of the WD.

According to yet another aspect, a method in a network node is provided. The method comprises configuring a wireless, WD, by transmitting an indication of a resource allocation to the WD; and receiving, from the WD, an uplink communication having a center frequency, the center frequency of the uplink communication based at least in part on a center frequency of a resource allocated by the transmitted indication of the resource allocation.

In some embodiments of this aspect, the WD is a narrowband-Internet of Things, NB-IoT, device. In some embodiments of this aspect, the resource allocation corresponds to a narrowband allocation. In some embodiments of this aspect, the resource is a resource block corresponding to an uplink channel. In some embodiments of this aspect, at least one of the indication of the resource allocation is a Resource Indication Value, RIV. In some embodiments of this aspect, the center frequency of the uplink communication is further based at least in part on an allowed center frequency range. In some embodiments of this aspect, the allowed center frequency range is one of a cell channel bandwidth range and a cell transmission bandwidth configuration range. In some embodiments of this aspect, the center frequency of the uplink communication is further based at least in part on a hardware capability of the WD.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
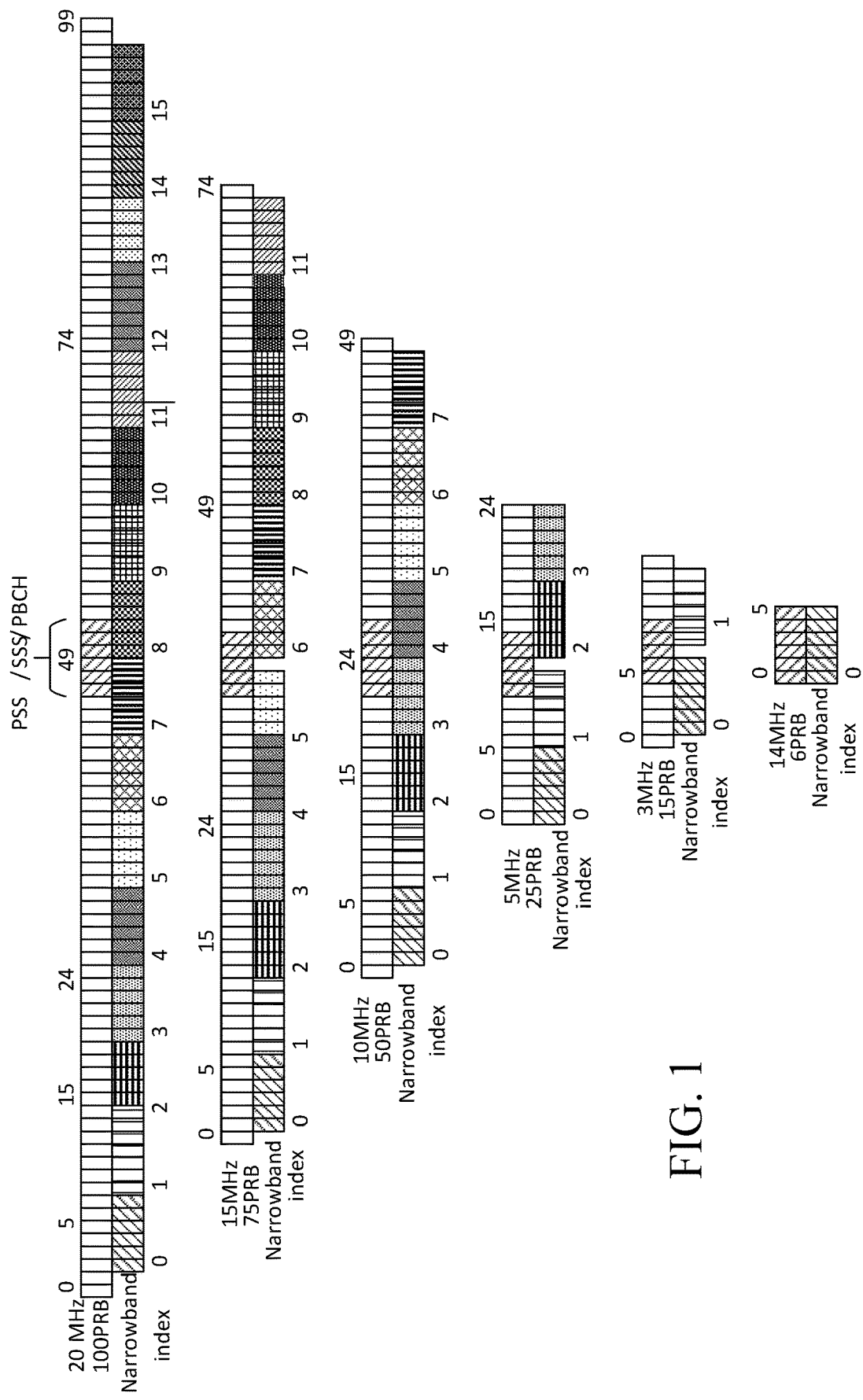
FIG. 1 illustrates a narrowband index allocation for different channel bandwidths.
Figure 2:
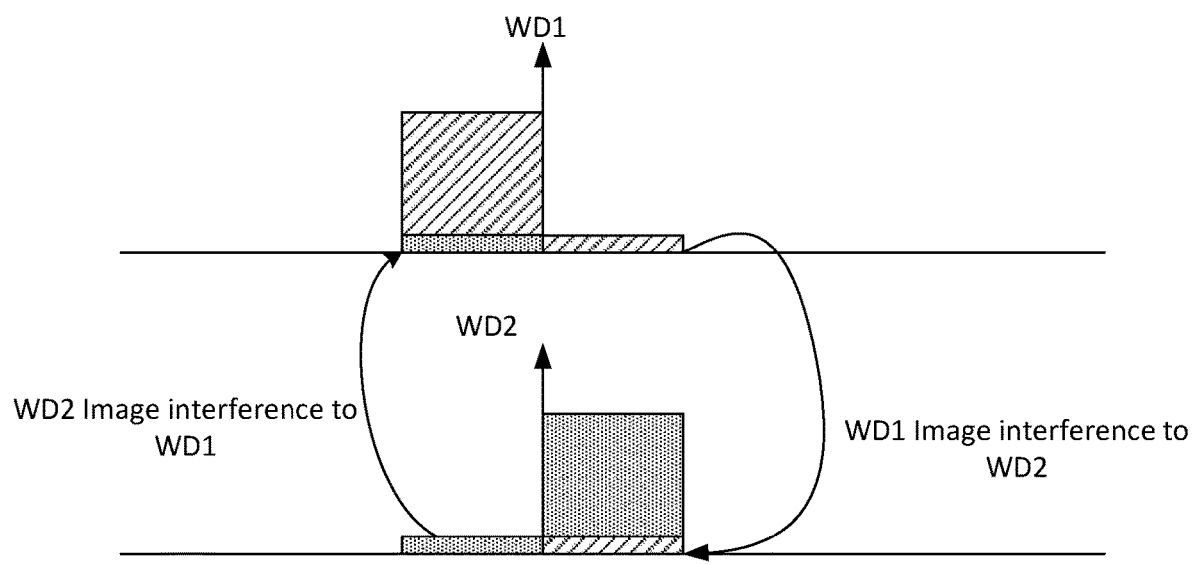
FIG. 2 illustrates a WD1 image interference to WD2.
Figure 3:
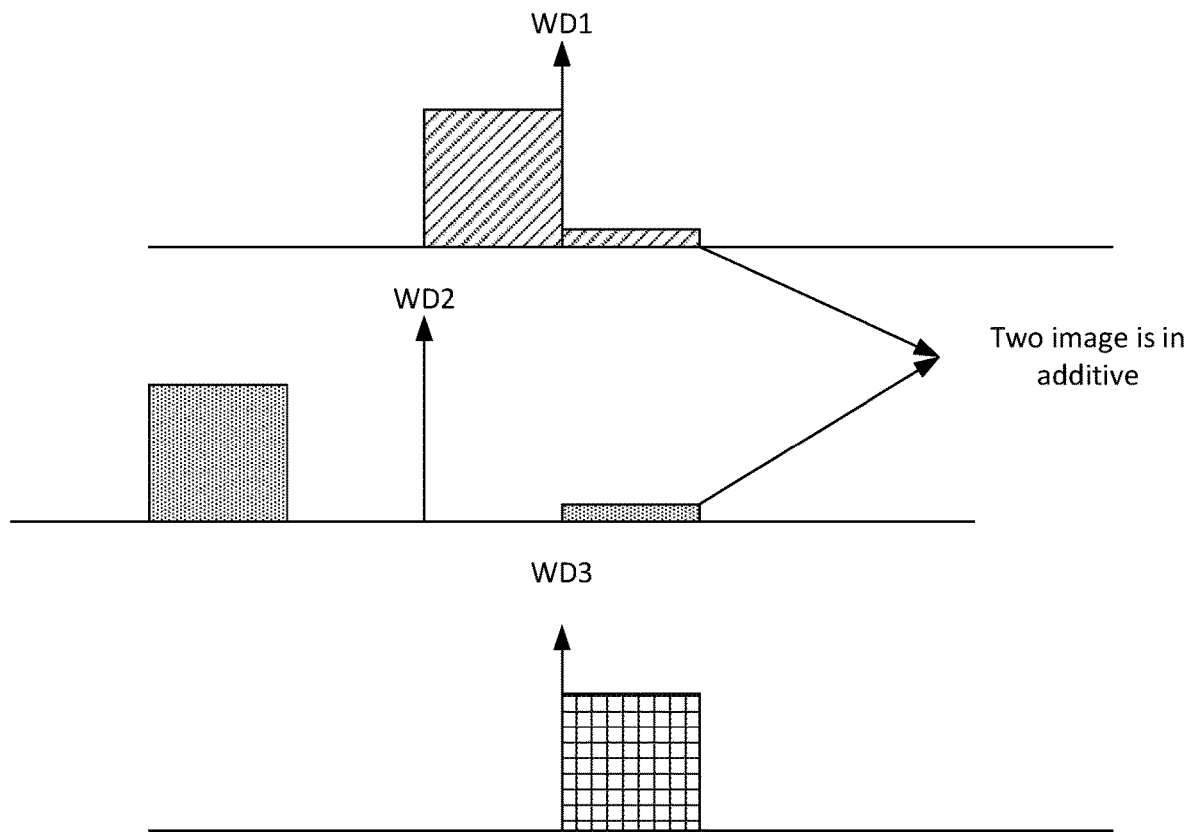
FIG. 3 illustrates a WD3 facing two different image products generated by WD1 and WD2.

Before describing in detail exemplary embodiments, it is noted that the embodiments reside primarily in combinations of apparatus components and processing steps related to methods and apparatuses for at least reducing an image interference for uplink transmission. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide methods and apparatuses for reducing the image interference by allowing and/or configuring the MTC WD to place the center frequency in the center of allocated resources.

Figure 4:
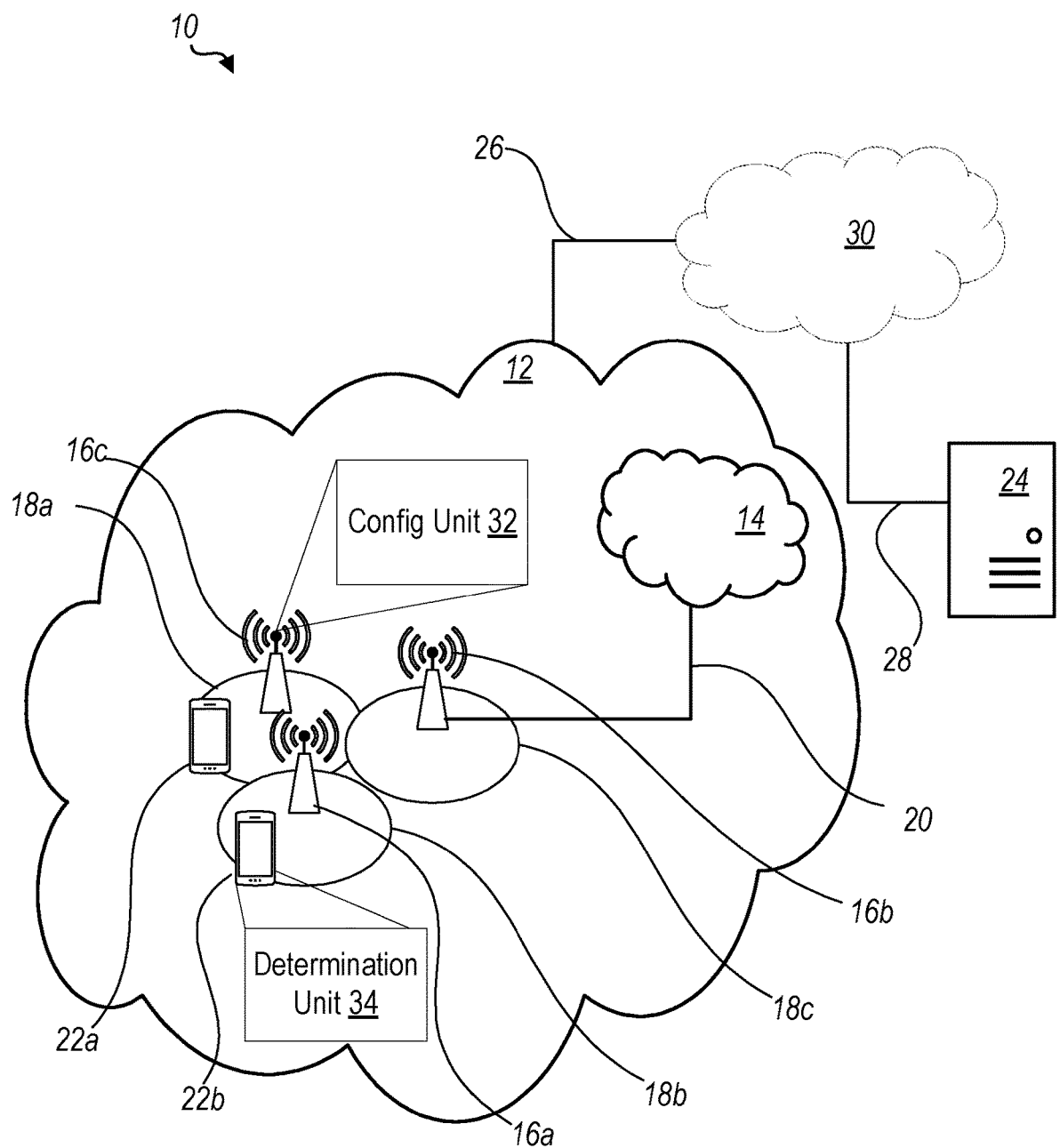
FIG. 4 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to configure the WD 22 by transmitting an indication of a resource allocation to the WD 22; and receive, from the WD 22, an uplink communication having a center frequency, the center frequency of the uplink communication based at least in part on a center frequency of a resource allocated by the transmitted indication of the resource allocation. In another embodiment, the network node 16 includes configuration unit 32 which is configured to transmit an indication of a resource allocation to the WD 22; and receive, from the WD 22, an uplink communication with a center frequency corresponding to one of a center frequency of a resource allocated by the transmitted indication of the resource allocation and an edge of an allowed center frequency range. In some embodiments, at least one of the indication of the resource allocation is a Resource Indication Value (RIV) and the resource allocated is a resource block corresponding to an uplink channel. In some embodiments, the allowed center frequency range is one of a cell channel bandwidth range and a cell transmission bandwidth configuration range.

A wireless device 22 is configured to include a determination unit 34 which is configured to receive an indication of a resource allocation from the network node 16; determine an uplink center frequency based at least in part on a center frequency of a resource allocated by the received indication of the resource allocation; and transmit uplink information according to the determined uplink center frequency. In another embodiment, the wireless device 22 includes determination unit 34 which is configured to receive an indication of a resource allocation from the network node 16; and determine an uplink center frequency based at least on a center frequency of a resource allocated by the received indication of the resource allocation. In some embodiments, at least one of the indication of the resource allocation is a Resource Indication Value (RIV) and the resource is a resource block corresponding to an uplink channel. In some embodiments, the determination unit 34 is further configured to transmit uplink information according to the determined uplink center frequency.

In some embodiments, the determination unit 34 is configured to determine the uplink center frequency based at least on the center frequency of the resource allocated by the received indication of the resource allocation by being further configured to at least one of: determine whether the center frequency of the resource is outside of an allowed center frequency range; if the center frequency of the resource is not outside of the allowed center frequency range, configure the uplink center frequency to be the center frequency of the resource; and if the center frequency of the source is outside of the allowed center frequency range, configure the uplink center frequency to be an edge of the allowed center frequency range. In some embodiments, the determination unit 34 is configured to determine the uplink center frequency based at least on the center frequency of the resource allocated by the received indication of the resource allocation by being further configured to at least one of: determine at least one possible center frequency based on a hardware capability of the WD 22; determine whether the center frequency of the resource is outside of an allowed center frequency range; if the center frequency of the resource is not outside of the allowed center frequency range, configure the uplink center frequency to be a nearest one of the determined at least one possible center frequency to the center frequency of the resource; and if the center frequency of the source is outside of the allowed center frequency range, configure the uplink center frequency to be a nearest one of the determined at least one possible center frequency to an edge of the allowed center frequency range. In some embodiments, the allowed center frequency range is one of a cell channel bandwidth range and a cell transmission bandwidth configuration range.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a communication unit 54 configured to enable the service provider to observe, monitor, control, transmit to and/or receive from the network node 16 and/or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 which is configured to configure the WD 22 by transmitting an indication of a resource allocation to the WD 22; and receive, from the WD 22, an uplink communication having a center frequency, the center frequency of the uplink communication based at least in part on a center frequency of a resource allocated by the transmitted indication of the resource allocation.

In some embodiments, the WD 22 is a narrowband-Internet of Things, NB-IoT, device. In some embodiments, the resource allocation corresponds to a narrowband allocation. In some embodiments, the resource is a resource block corresponding to an uplink channel. In some embodiments, at least one of the indication of the resource allocation is a Resource Indication Value, RIV. In some embodiments, the center frequency of the uplink communication is further based at least in part on an allowed center frequency range. In some embodiments, the allowed center frequency range is one of a cell channel bandwidth range and a cell transmission bandwidth configuration range. In some embodiments, the center frequency of the uplink communication is further based at least in part on a hardware capability of the WD 22.

In another embodiment, configuration unit 32 is configured to transmit an indication of a resource allocation to the WD 22; and receive, from the WD 22, an uplink communication with a center frequency corresponding to one of a center frequency of a resource allocated by the transmitted indication of the resource allocation and an edge of an allowed center frequency range. In some embodiments, at least one of the indication of the resource allocation is a Resource Indication Value (RIV) and the resource allocated is a resource block corresponding to an uplink channel. In some embodiments, the allowed center frequency range is one of a cell channel bandwidth range and a cell transmission bandwidth configuration range.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a determination unit 34 which is configured to receive an indication of a resource allocation from the network node 16; determine an uplink center frequency based at least in part on a center frequency of a resource allocated by the received indication of the resource allocation; and transmit uplink information according to the determined uplink center frequency.

In some embodiments, the WD 22 is a narrowband-Internet of Things, NB-IoT, device. In some embodiments, the resource allocation corresponds to a narrowband allocation. In some embodiments, the resource is a resource block corresponding to an uplink channel. In some embodiments, at least one of the indication of the resource allocation is a Resource Indication Value, RIV. In some embodiments, the processing circuitry 84 is further configured to determine the uplink center frequency based at least in part on the center frequency of the resource allocated by the received indication of the resource allocation by being further configured to: determine whether the center frequency of the resource is outside of an allowed center frequency range; if the center frequency of the resource is not outside of the allowed center frequency range, configure the uplink center frequency to be the center frequency of the resource; and if the center frequency of the resource is outside of the allowed center frequency range, configure the uplink center frequency to be an edge of the allowed center frequency range. In some embodiments, the processing circuitry 84 is further configured to determine the uplink center frequency based at least in part on the center frequency of the resource allocated by the received indication of the resource allocation by being further configured to: determine at least one possible center frequency based on a hardware capability of the WD 22; determine whether the center frequency of the resource is outside of an allowed center frequency range; if the center frequency of the resource is not outside of the allowed center frequency range, configure the uplink center frequency to be a nearest one of the determined at least one possible center frequency to the center frequency of the resource; and if the center frequency of the resource is outside of the allowed center frequency range, configure the uplink center frequency to be a nearest one of the determined at least one possible center frequency to an edge of the allowed center frequency range. In some embodiments, the allowed center frequency range is one of a cell channel bandwidth range and a cell transmission bandwidth configuration range.

In another embodiment, determination unit 34 is configured to receive an indication of a resource allocation from the network node 16; and determine an uplink center frequency based at least on a center frequency of a resource allocated by the received indication of the resource allocation.

In some embodiments, at least one of the indication of the resource allocation is a Resource Indication Value (RIV) and the resource is a resource block corresponding to an uplink channel. In some embodiments, the processing circuitry 84 is further configured to transmit uplink information according to the determined uplink center frequency. In some embodiments, the processing circuitry 84 is configured to determine the uplink center frequency based at least on the center frequency of the resource allocated by the received indication of the resource allocation by being further configured to at least one of: determine whether the center frequency of the resource is outside of an allowed center frequency range; if the center frequency of the resource is not outside of the allowed center frequency range, configure the uplink center frequency to be the center frequency of the resource; and if the center frequency of the source is outside of the allowed center frequency range, configure the uplink center frequency to be an edge of the allowed center frequency range. In some embodiments, the processing circuitry 84 is configured to determine the uplink center frequency based at least on the center frequency of the resource allocated by the received indication of the resource allocation by being further configured to at least one of: determine at least one possible center frequency based on a hardware capability of the WD 22; determine whether the center frequency of the resource is outside of an allowed center frequency range; if the center frequency of the resource is not outside of the allowed center frequency range, configure the uplink center frequency to be a nearest one of the determined at least one possible center frequency to the center frequency of the resource; and if the center frequency of the source is outside of the allowed center frequency range, configure the uplink center frequency to be a nearest one of the determined at least one possible center frequency to an edge of the allowed center frequency range. In some embodiments, the allowed center frequency range is one of a cell channel bandwidth range and a cell transmission bandwidth configuration range.

Figure 5:
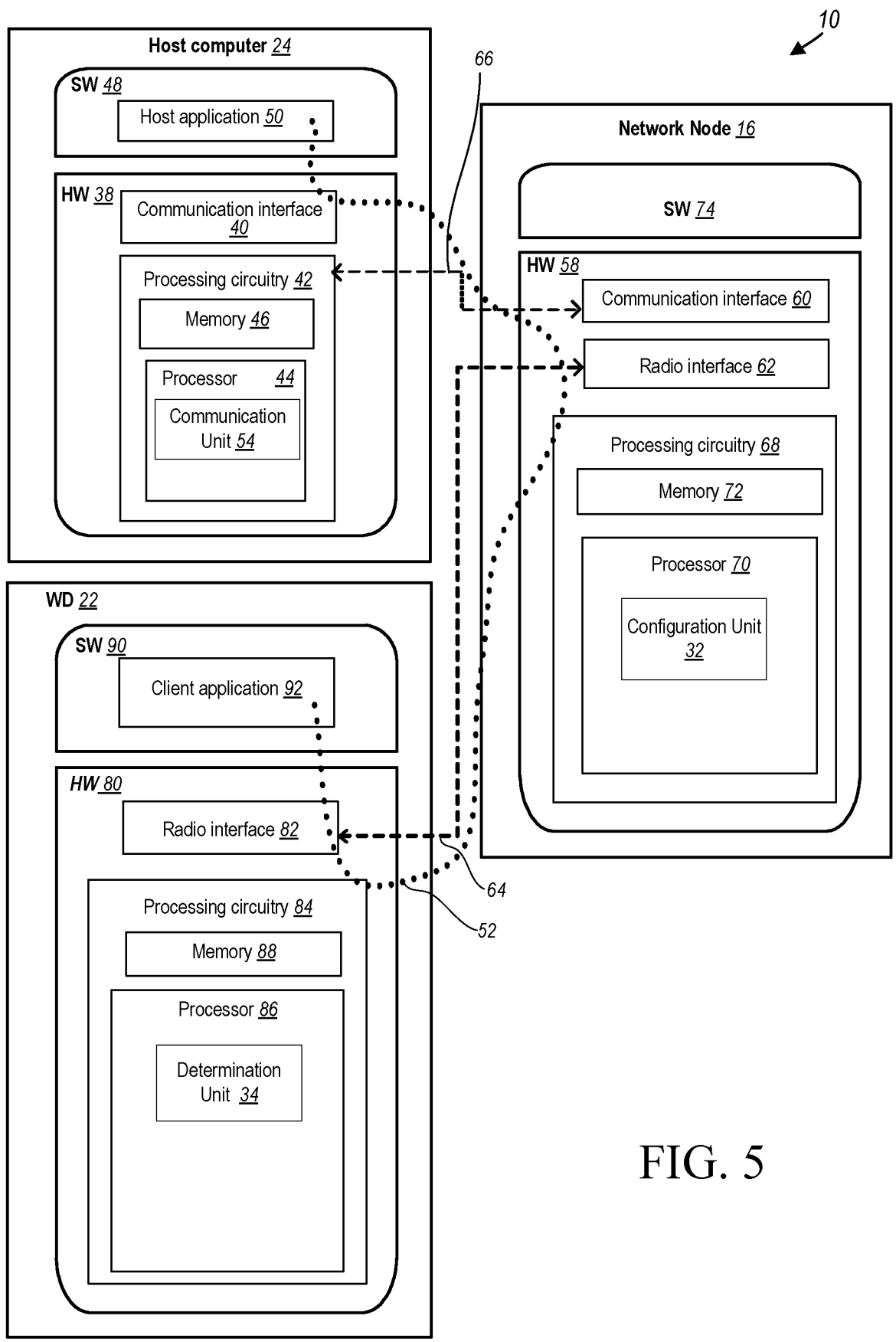
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as configuration unit 32, and determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 6, 7:
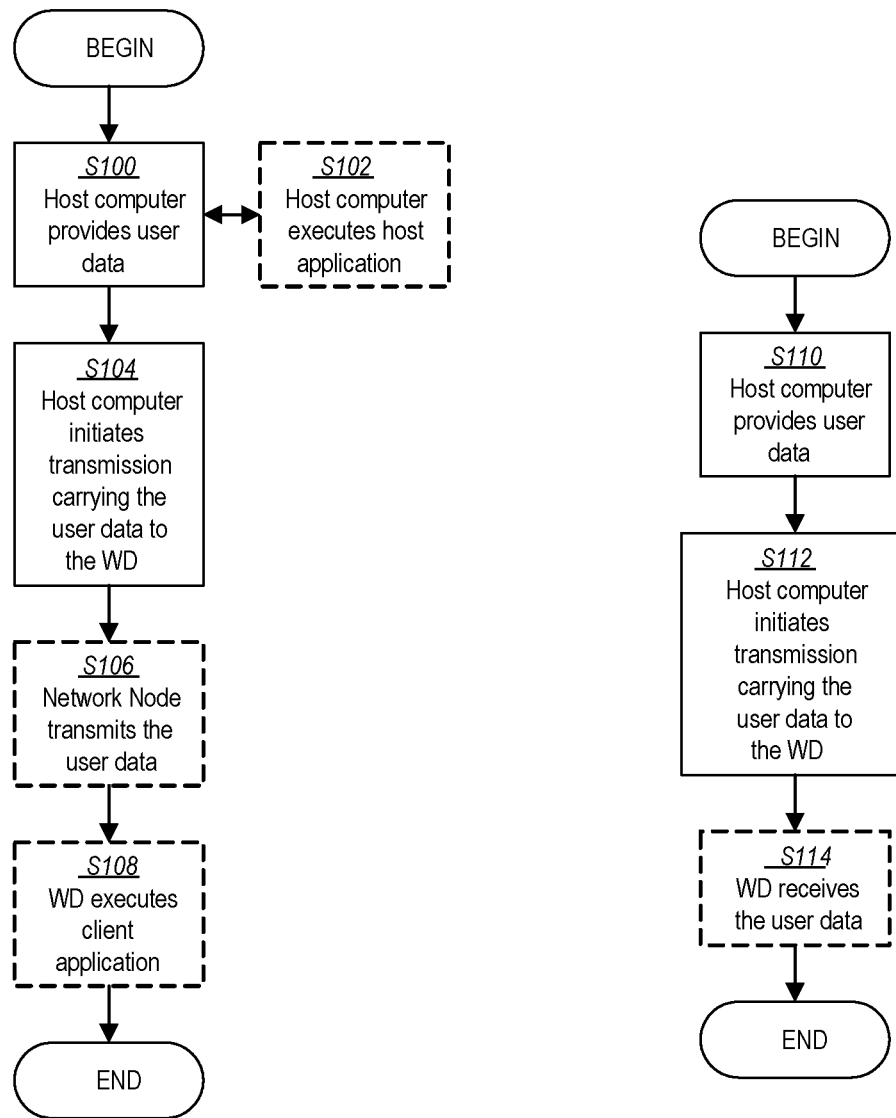
FIG. 6 is a block diagram of a host computer communicating via a radio node with a wireless device over an at least partially wireless connection according to some embodiments of the present disclosure.
FIG. 7 is a flow chart illustrating exemplary methods implemented in a communication system including a host computer, a radio node and a wireless device for executing a client application at a wireless device according to some embodiments of the present disclosure.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figure 8:
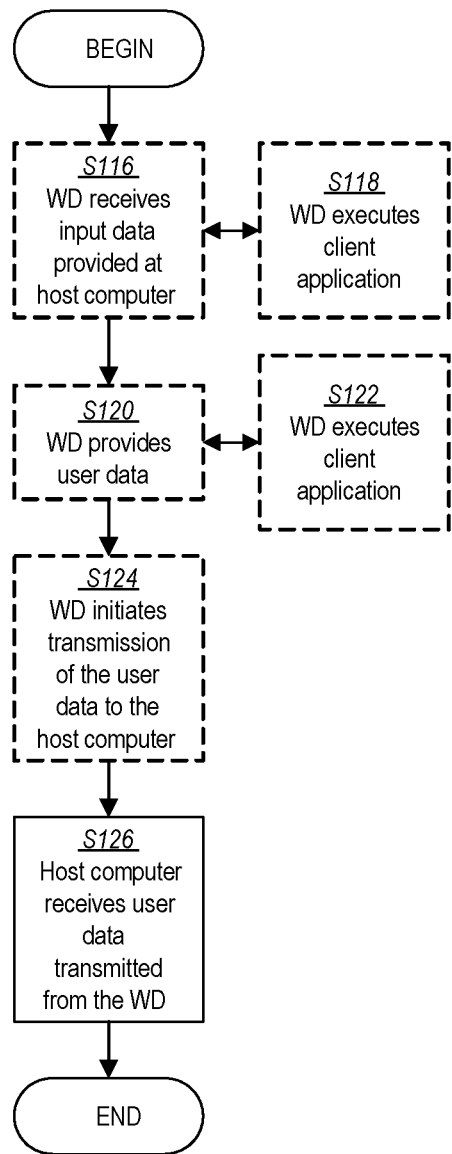
FIG. 8 is a flow chart illustrating exemplary methods implemented in a communication system including a host computer, a radio node and a wireless device for receiving user data at a wireless device according to some embodiments of the present disclosure.

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (block S116). In an optional sub step of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

Figure 9:
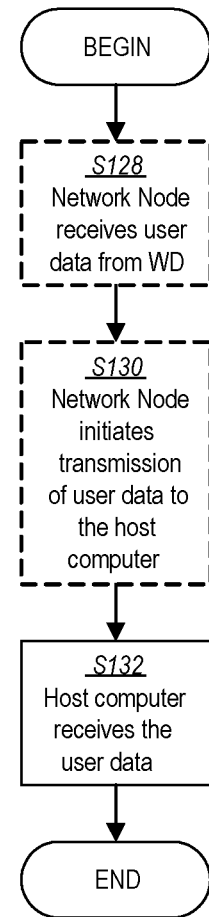
FIG. 9 is a flow chart illustrating exemplary methods implemented in a communication system including a host computer, a radio node and a wireless device for receiving user data from the wireless device at a host computer according to some embodiments of the present disclosure.

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 10:
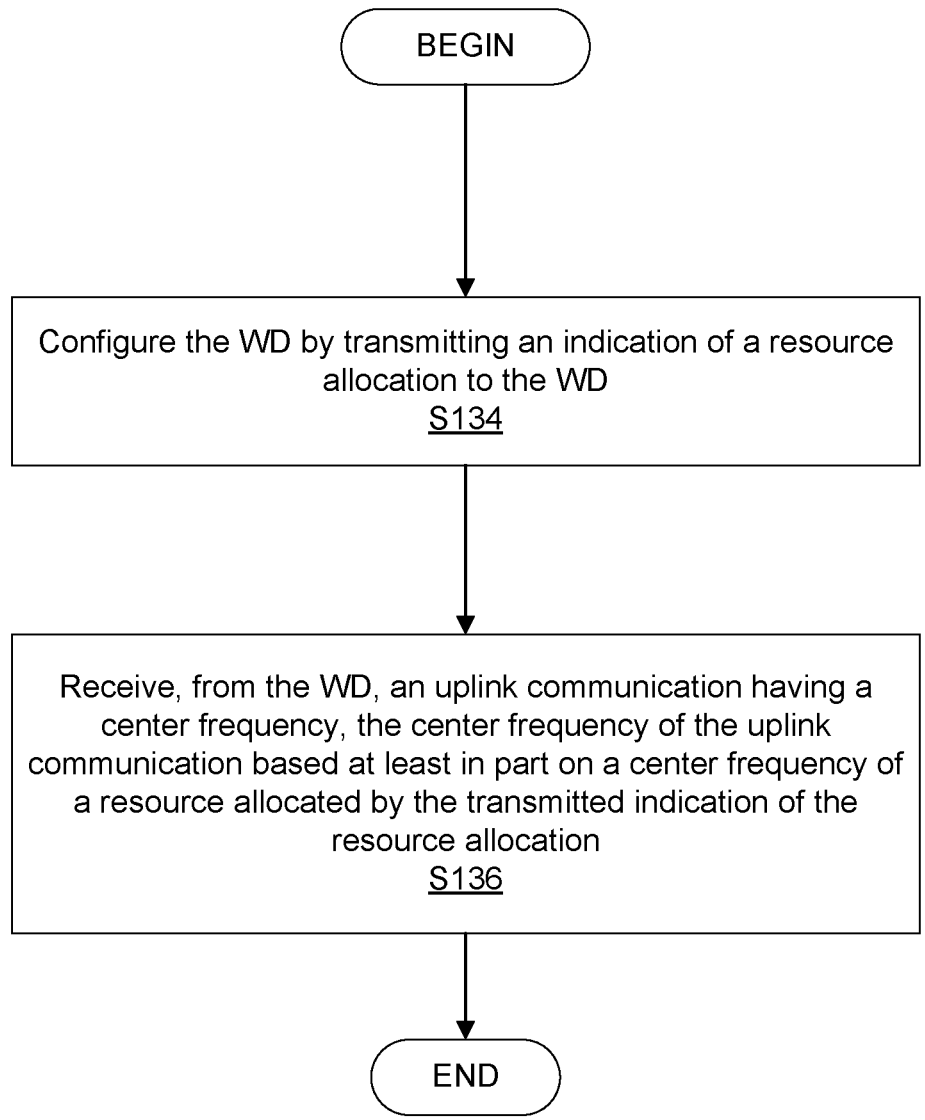
FIG. 10 is a flowchart of an exemplary process in a network node for configuration a resource allocation according to some embodiments of the present disclosure.

FIG. 10 is a flowchart of an exemplary process in a network node 16. One or more Blocks and/or functions and/or methods performed by the network node 16 may be performed by one or more elements of network node 16 such as by configuration unit 32 in processing circuitry 68, processor 70, radio interface 62, etc. according to the example process. The process includes configuring (block S134), such as via configuration unit 32, a wireless, WD, by transmitting an indication of a resource allocation to the WD 22; and receiving (block S136), such as via configuration unit 32, from the WD 22, an uplink communication having a center frequency, the center frequency of the uplink communication based at least in part on a center frequency of a resource allocated by the transmitted indication of the resource allocation.

In some embodiments, the WD 22 is a narrowband-Internet of Things, NB-IoT, device. In some embodiments, the resource allocation corresponds to a narrowband allocation. In some embodiments, the resource is a resource block corresponding to an uplink channel. In some embodiments, at least one of the indication of the resource allocation is a Resource Indication Value, RIV. In some embodiments, the center frequency of the uplink communication is further based at least in part on an allowed center frequency range. In some embodiments, the allowed center frequency range is one of a cell channel bandwidth range and a cell transmission bandwidth configuration range. In some embodiments, the center frequency of the uplink communication is further based at least in part on a hardware capability of the WD 22.

In another embodiment, the process/method comprises transmitting an indication of a resource allocation to the WD 22; and receiving, from the WD 22, an uplink communication with a center frequency corresponding to one of a center frequency of a resource allocated by the transmitted indication of the resource allocation and an edge of an allowed center frequency range. In some embodiments, at least one of the indication of the resource allocation is a Resource Indication Value (RIV) and the resource allocated is a resource block corresponding to an uplink channel. In some embodiments, the allowed center frequency range is one of a cell channel bandwidth range and a cell transmission bandwidth configuration range.

Figure 11:
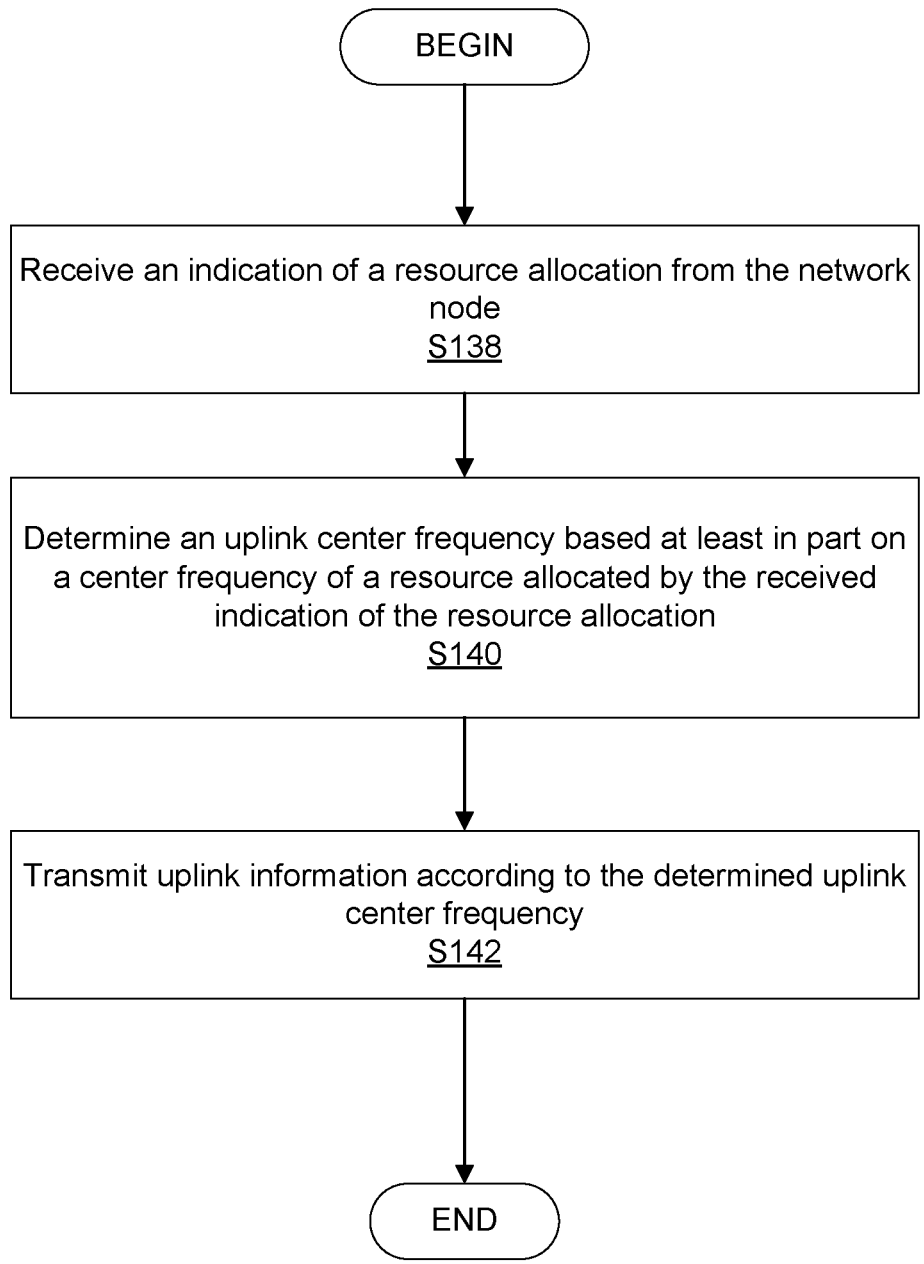
FIG. 11 is a flowchart of an exemplary process in a wireless device for determining an uplink center frequency according to some embodiments of the present disclosure.

FIG. 11 is a flowchart of an exemplary process in a wireless device 22 according to some embodiments of the present disclosure. One or more Blocks and/or functions and/or methods performed by WD 22 may be performed by one or more elements of WD 22 such as by determination unit 34 in processing circuitry 84, processor 86, radio interface 82, etc. The process includes receiving (block S138), such as via determination unit 34, an indication of a resource allocation from a network node 16. The process includes determining (block S140), such as via determination unit 34, an uplink center frequency based at least in part on a center frequency of a resource allocated by the received indication of the resource allocation. The process includes transmitting (block S142), such as via determination unit 34 and/or radio interface 82, uplink information according to the determined uplink center frequency.

In some embodiments, the WD 22 is a narrowband-Internet of Things, NB-IoT, device. In some embodiments, the resource allocation corresponds to a narrowband allocation. In some embodiments, the resource is a resource block corresponding to an uplink channel. In some embodiments, at least one of the indication of the resource allocation is a Resource Indication Value, RIV. In some embodiments, the determining the uplink center frequency based at least in part on the center frequency of the resource allocated by the received indication of the resource allocation further comprises: determining, such as via determination unit 34, whether the center frequency of the resource is outside of an allowed center frequency range; if the center frequency of the resource is not outside of the allowed center frequency range, configuring the uplink center frequency to be the center frequency of the resource; and if the center frequency of the resource is outside of the allowed center frequency range, configuring the uplink center frequency to be an edge of the allowed center frequency range. In some embodiments, the determining the uplink center frequency based at least in part on the center frequency of the resource allocated by the received indication of the resource allocation further comprises: determining, such as via determination unit 34, at least one possible center frequency based on a hardware capability of the WD 22; determining whether the center frequency of the resource is outside of an allowed center frequency range; if the center frequency of the resource is not outside of the allowed center frequency range, configuring the uplink center frequency to be a nearest one of the determined at least one possible center frequency to the center frequency of the resource; and if the center frequency of the resource is outside of the allowed center frequency range, configuring, such as via determination unit 34, the uplink center frequency to be a nearest one of the determined at least one possible center frequency to an edge of the allowed center frequency range. In some embodiments, the allowed center frequency range is one of a cell channel bandwidth range and a cell transmission bandwidth configuration range.

In another embodiment, the process/method includes receiving an indication of a resource allocation from the network node 16, and determining an uplink center frequency based at least on a center frequency of a resource allocated by the received indication of the resource allocation. In some embodiments, at least one of the indication of the resource allocation is a Resource Indication Value (RIV) and the resource is a resource block corresponding to an uplink channel.

In some embodiments, the method further comprises transmitting uplink information according to the determined uplink center frequency. In some embodiments, determining the uplink center frequency based at least on the center frequency of the resource allocated by the received indication of the resource allocation further comprises to at least one of: determining whether the center frequency of the resource is outside of an allowed center frequency range; if the center frequency of the resource is not outside of the allowed center frequency range, configuring the uplink center frequency to be the center frequency of the resource; and if the center frequency of the source is outside of the allowed center frequency range, configuring the uplink center frequency to be an edge of the allowed center frequency range. In some embodiments, determining the uplink center frequency based at least on the center frequency of the resource allocated by the received indication of the resource allocation further comprises to at least one of: determining at least one possible center frequency based on a hardware capability of the WD 22; determining whether the center frequency of the resource is outside of an allowed center frequency range; if the center frequency of the resource is not outside of the allowed center frequency range, configuring the uplink center frequency to be a nearest one of the determined at least one possible center frequency to the center frequency of the resource; and if the center frequency of the source is outside of the allowed center frequency range, configuring the uplink center frequency to be a nearest one of the determined at least one possible center frequency to an edge of the allowed center frequency range. In some embodiments, the allowed center frequency range is one of a cell channel bandwidth range and a cell transmission bandwidth configuration range.

Having generally described some embodiments of the present disclosure, a more detailed description of some of the embodiments are described below.

According to a first embodiment, as a result of the WD 22 receiving a Resource Indication Value (RIV) from a network node 16 (e.g., eNB), the WD 22 may prepare its uplink (UL) transmission using the resource allocated. For example, in some aspects, one of the preparations may be for the WD 22 to adjust a center frequency for such uplink transmission bandwidth according to the center of the allocated resource block.

Figure 12:
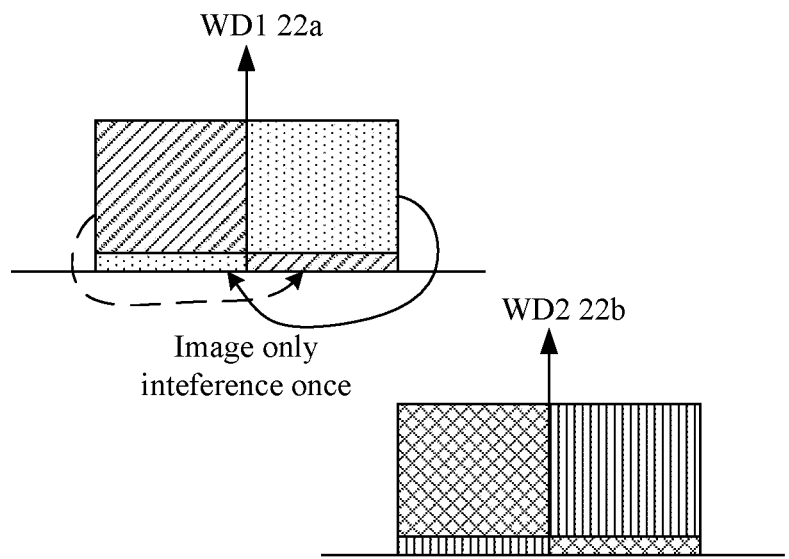
FIG. 12 illustrates that WD1 and WD2 center frequency is located at center of the allocated resource.

FIG. 12 illustrates an example where WD1 (e.g., WD 22*a*) center frequency is located on the center of the allocated resource block, and, therefore, the image product generated may interfere with only the same WD1 (e.g., WD 22*a*). In this manner, there may be no other image generated at the same resource allocation, which may reduce the image interference from different WDs (e.g., WD2*b*) at the network level.

Figure 13:
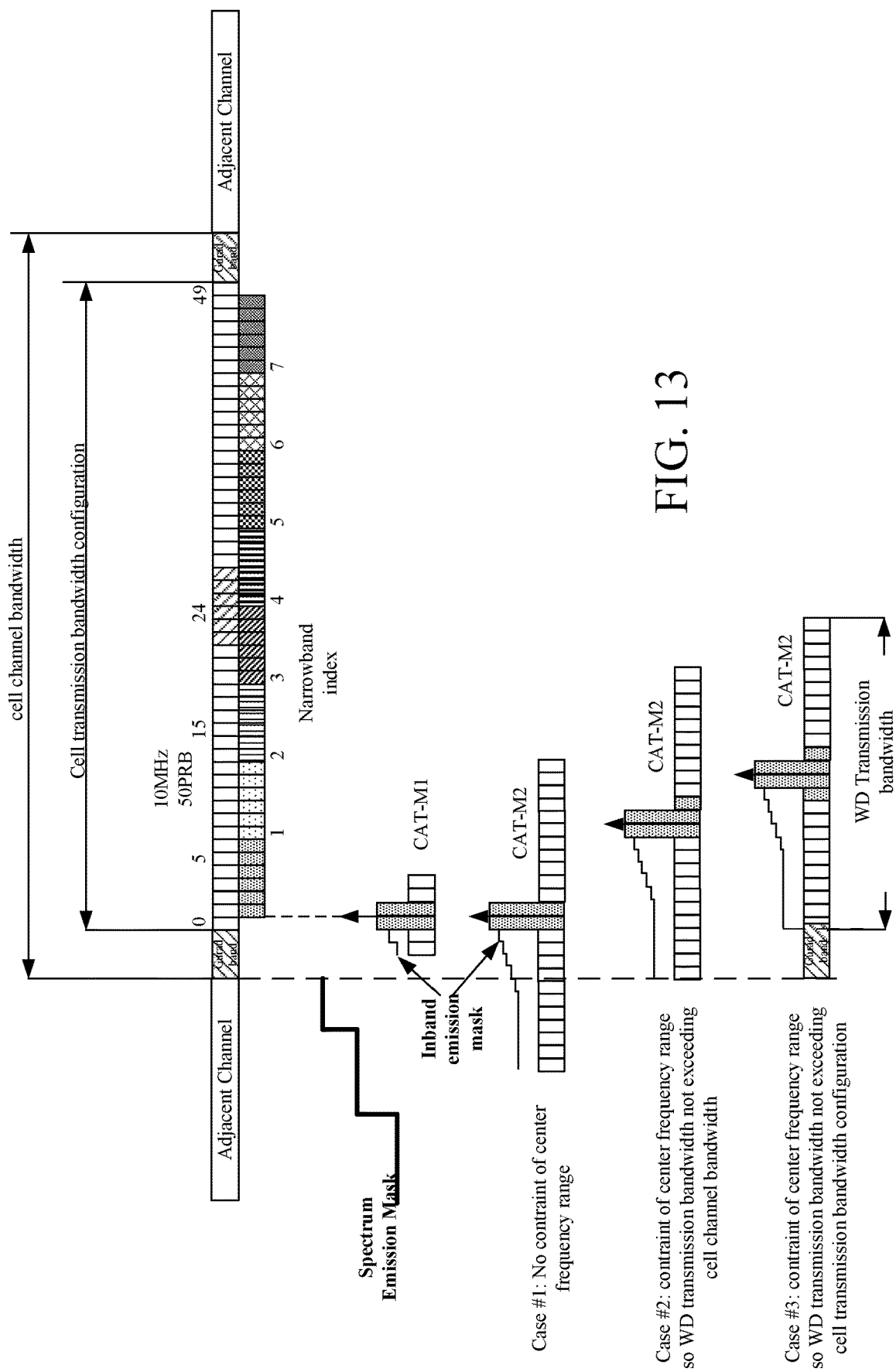
FIG. 13 illustrates example cases where WD center frequency may be in a limited range.

There may be several cases where the range of center frequency of the WD 22 may be specified. FIG. 13 illustrates some of these exemplary cases as follows:

Case #1: There is no constraint or limitation on the center frequency in this case, when the in-band emission mask overlaps with the spectrum emission mask, and an additional power amplifier (PA) back-off may be incurred in WD 22.

Case #2: Constrain the center frequency range within the cell channel bandwidth. In such case, the PA back-off may not be as high as, for example, case #1.

Case #3: Constrain the center frequency range within the cell transmission bandwidth. This may be considered similar to the normal cell allocation.

Figure 14:
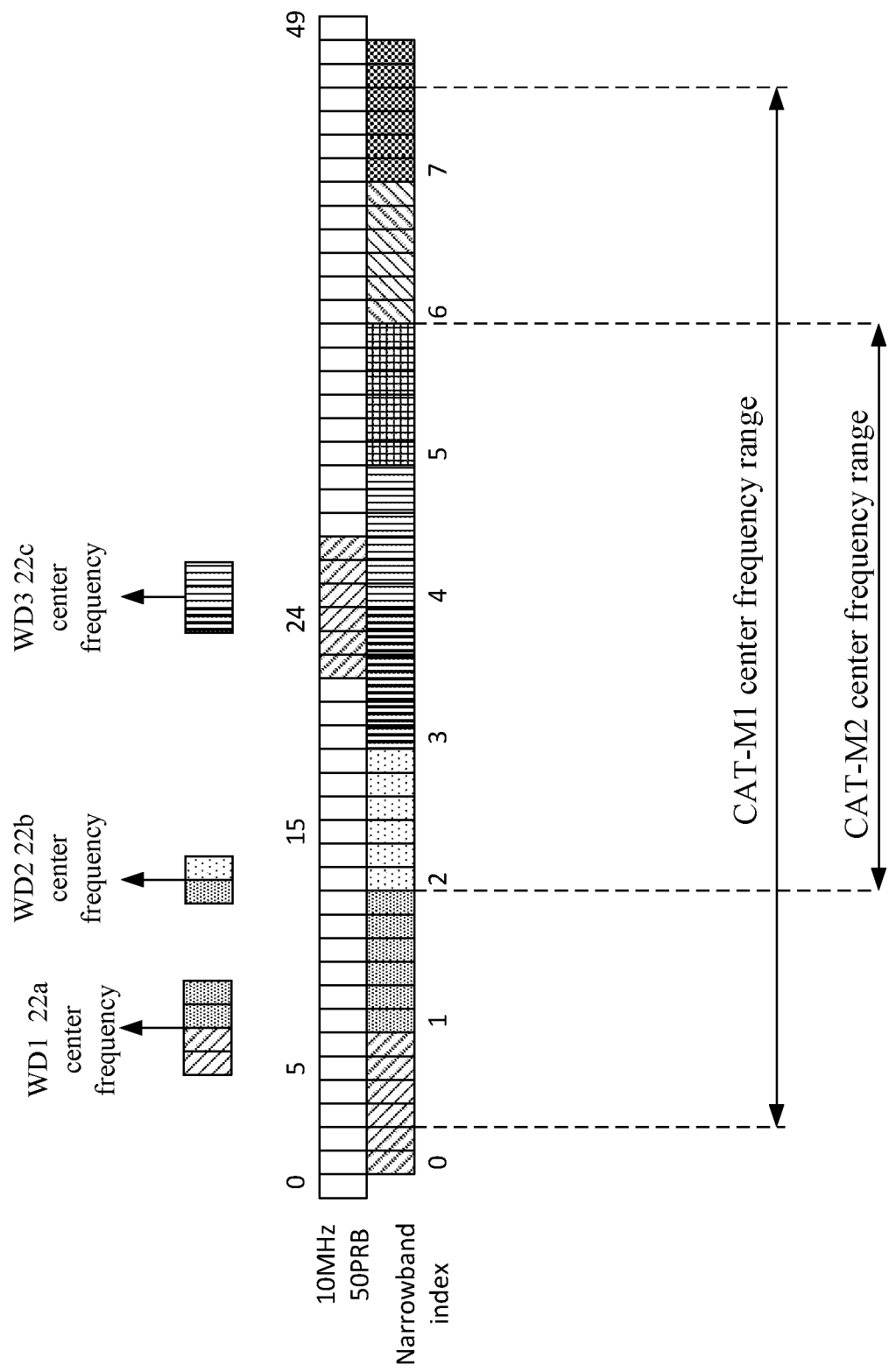
FIG. 14 illustrates an example of a center frequency range for CAT-M1 and CAT-M2 device.

FIG. 14 illustrates a center frequency range for a CAT-M1 and a CAT M2 device, which may be the WD 22 in some embodiments.

In below description, a WD 22 procedure is described based on an assumption of some constraint of WD 22 center frequency, which corresponds to, for example, case #2 and/or case #3.

In some embodiments, there are at least two different center frequency ranges that could be used by the WD 22 (e.g., CAT-M1 device, CAT-M2 device). When the resource is allocated at the channel edge, the WD 22 (e.g., CAT-M1 or CAT-M2 device) can place the center frequency at the edge of the allowed center frequency range.

Figure 15:
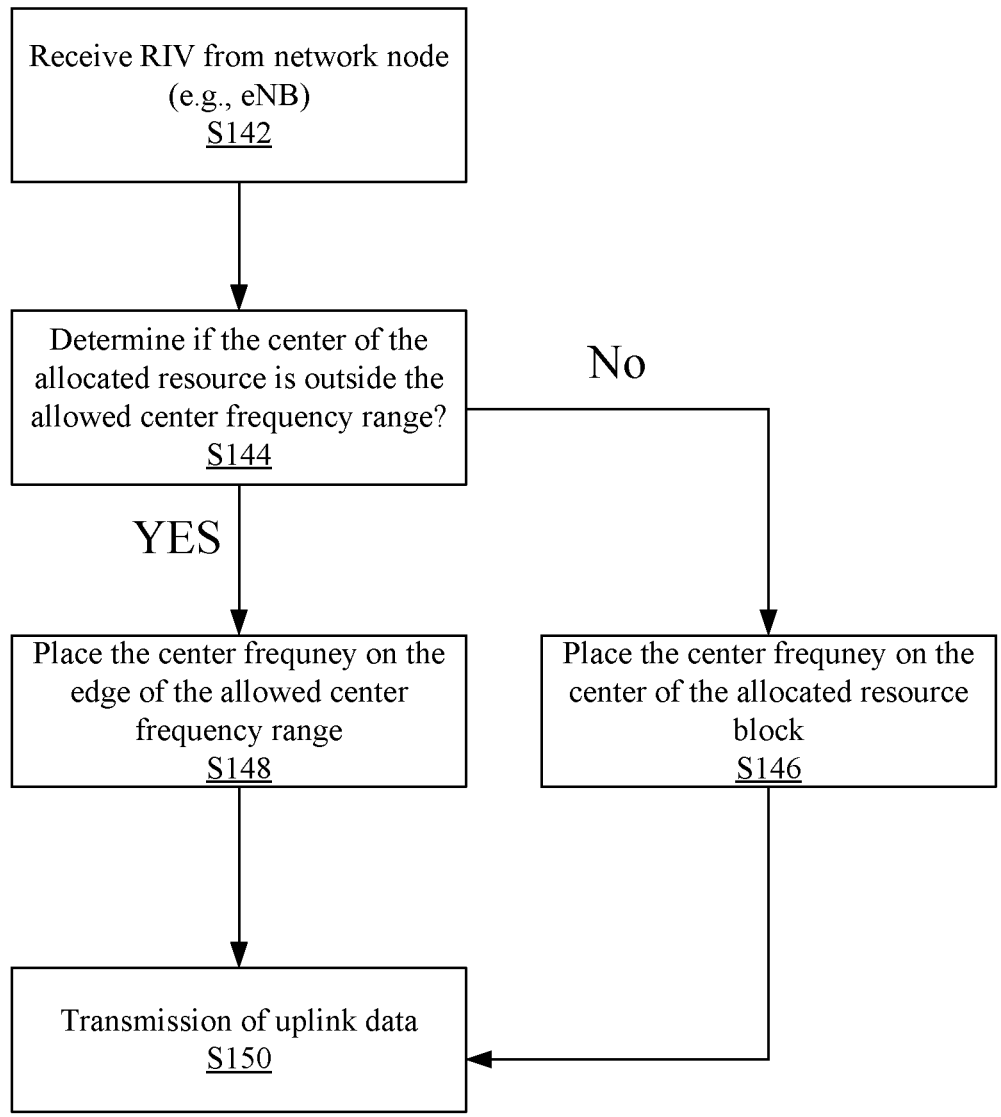
FIG. 15 illustrates an example method where a WD center frequency is determined according to some embodiments of the present disclosure.

One exemplary procedure for the setting center frequency of WD 22 is showed in FIG. 15. The procedure/method may be described as follows, with reference to FIG. 15. In one embodiment such exemplary method may be performed by the WD 22.

Step 1 (block S142): Receiving RIV from the network node 16 (e.g., eNB).

Step 2 (block S144): Determine if the center frequency of the allocated resource block (e.g., indicated by the RIV) exceeds an allowed center frequency range.

Step 3 (block S146): If not exceeded, place the uplink center frequency in the center of the allocated resource block, and proceed to step 5.

Step 4 (block S148): If exceeded, place the uplink center frequency at the edge of the allowed center frequency range.

Step 5 (block S150): Transmit the uplink data or information e.g. according to the placed/configured uplink center frequency determined in steps 3 and/or 4.

According to a second embodiment, in a practical implementation for some types of WDs, the WD 22 (e.g., MTC-type WD) may be, for example, a cost effective device, that in reality includes a low-quality phase-locked loop (PLL) that may not have the capability of the subcarrier tuning step. Therefore, this may result in a non-centered frequency (as compared to the first embodiment described above). In such a case, the WD 22 may place/configure the uplink near the ideal center frequency similarly as described in the first embodiment.

Figure 16:
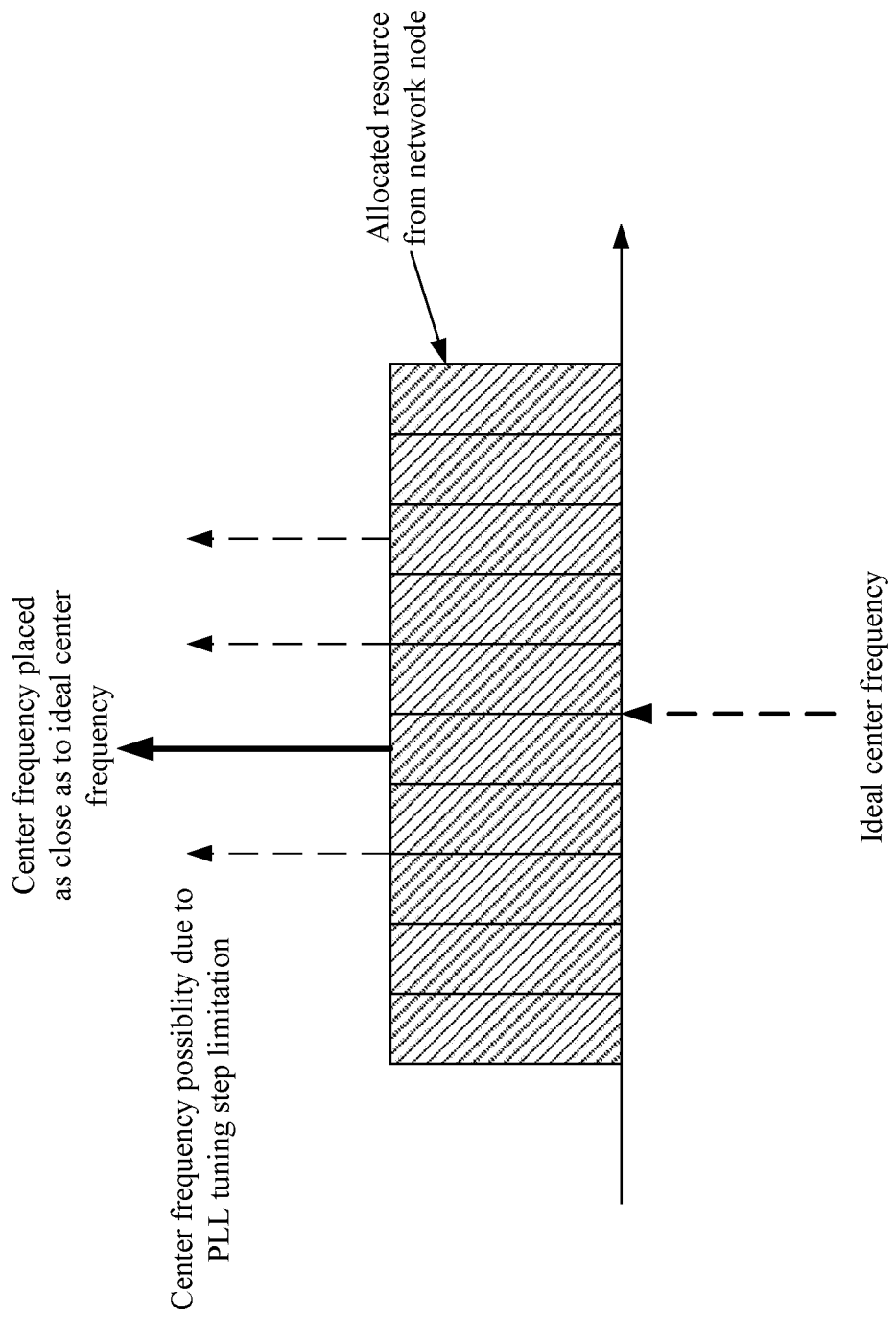
FIG. 16 illustrates an example of placing a center frequency near the ideal center frequency due to a limitation on the PLL tuning capability of the WD.

For example, FIG. 16 shows that, due to the PLL limitation, there can be several possible center frequency positions that the WD 22 can configure. In such a case, the WD 22 may select a proximate (or the closest possible) center frequency to the ideal center frequency, the ideal center frequency being a center of the allocated resource. In such case, the image interference can still be controlled or reduced in the system.

Figure 17:
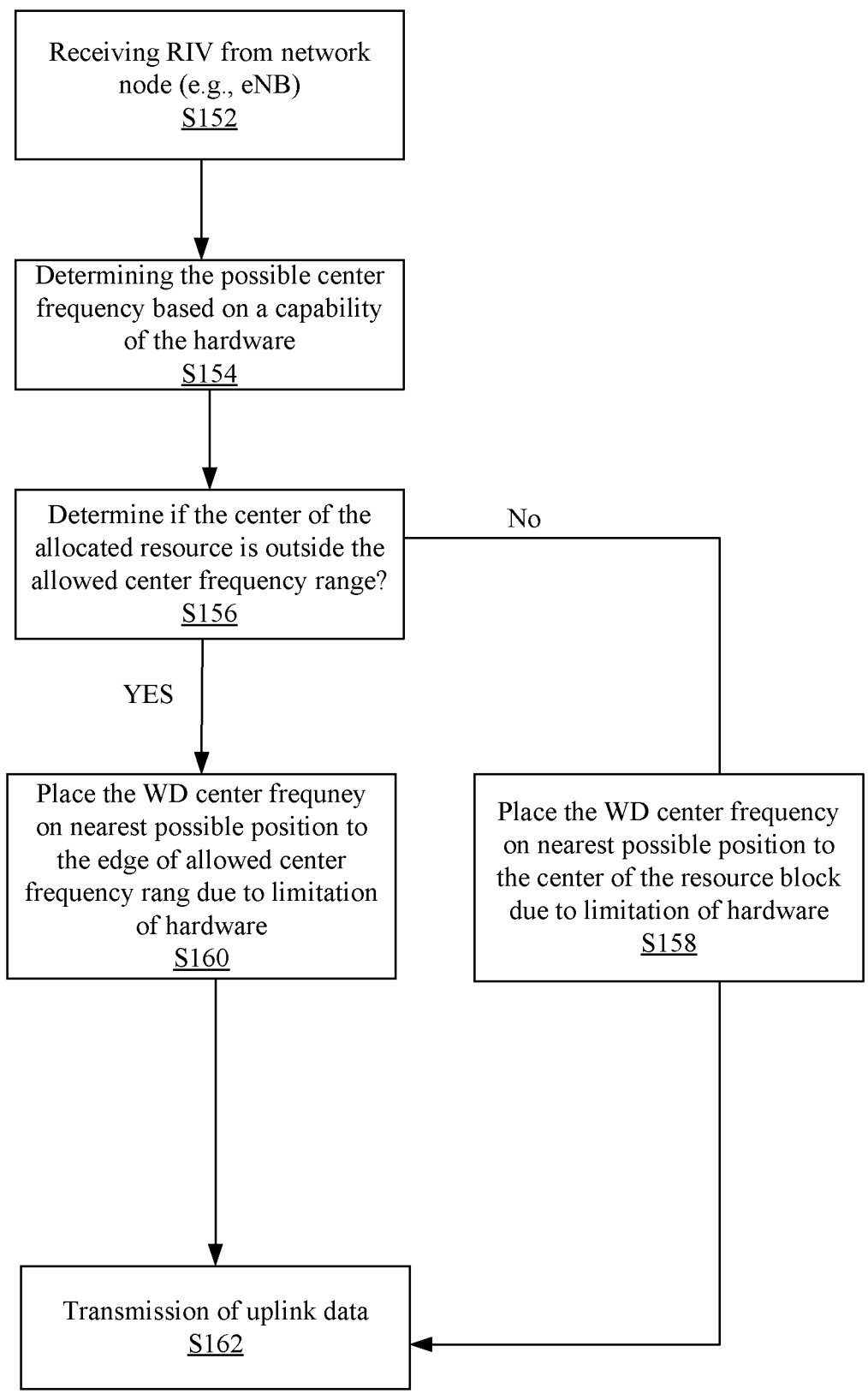
FIG. 17 illustrates an example method where a WD center frequency is determined for a limited PLL tuning capability according to some embodiments of the present disclosure.

One exemplary procedure/method for the second embodiment is shown in FIG. 17, with following steps:

Step 1 (block S152): receiving the RIV from network node 16.

Step 2 (block S154): determining the possible center frequency position based on a hardware capability (e.g., PLL tuning step).

Step 3 (block S156): determine if the center of the allocated resource is outside of the allowed center frequency range.

Step 4 (block S158): if not exceed, place the WD 22 center frequency on a nearest possible position to the center of the resource block based on, e.g., a limitation of the WD 22 hardware, and proceed Step 6.

Step 5 (block S160): if exceeded (e.g., yes), place the WD 22 center frequency on a nearest possible position to the edge of allowed center frequency range due to e.g. a limitation of the WD 22 hardware.

Step 6 (block S162): Transmit the uplink data or information e.g. according to the placed/configured uplink center frequency determined in steps 4 and/or 5.

Although the example procedures described above for the first and second embodiments describes determining whether the center of the allocated resources is outside of the allowed center frequency range, it should be understood that in some embodiments, the determination may be whether the center of the allocated resources is within the allowed center frequency range. In such embodiments, the steps following such determination may be, for example, if the WD 22 center frequency is within the allowed center frequency range, place the center frequency on the center of the allocated resource (or nearest ideal center as the case may be) and if the WD 22 center frequency is not within the allowed center frequency range, place the center frequency on an edge of the allowed center frequency (of nearest position to the edge as the case may be). This should be apparent from the description above. Furthermore, although some embodiments describe placing the WD 22 center frequency on the nearest possible position (e.g. second embodiment), in other embodiments the WD 22 may place the center frequency on a near position, which may not necessarily be the nearest possible position.

In some embodiments, the term "outside" of a particular range (e.g., allowed center frequency range) may correspond to such range being either considered an inclusive range or an exclusive range. In other words, the range may in some embodiments include the border values of the range (i.e., inclusive range), in which case, in some embodiments, the term outside may indicate a frequency outside of that inclusive range. In some embodiments, however, the range may be considered to not include the border values of the range (e.g., exclusive range), in which case, the term outside may indicate a frequency that is at the border of the range as well as outside of the range. Such nuances for defining a range of values as either including the border or not including the border of the range should be understood by those of ordinary skill in the art.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling, based on the utilized resource sequence, implicitly indicates the control signaling type. In some embodiments described herein, the indication is an indication of a resource allocation from the network node 16 to a WD 22.

A channel may generally be a logical or physical channel. A channel may comprise and/or be arranged on one or more carriers, in particular a plurality of subcarriers. A wireless communication network may comprise at least one network node, in particular a network node as described herein. A terminal connected or communicating with a network may be considered to be connected or communicating with at least one network node, in particular any one of the network nodes described herein.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data. In some embodiments, the channel described herein may be an uplink channel and in further embodiments may be a physical uplink shared channel (PUSCH) and in yet further embodiments may be a flexible PUSCH.

Transmitting in downlink may pertain to transmission from the network or network node to the terminal. The terminal may be considered the WD. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device (WD) or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device (e.g., the indication of the resource allocation as discussed above). Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Configuring a Radio Node

Configuring a radio node, in particular a terminal or user equipment or the WD 22, may refer to the radio node being adapted or caused or set and/or instructed to operate according to the configuration. Configuring may be done by another device, e.g., a network node 16 (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node 16. A network node 16 may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device 22). Alternatively, or additionally, configuring a radio node, e.g., by a network node 16 or other device, may include receiving configuration data and/or data pertaining to configuration data, e.g., from another node like a network node 16, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD 22) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD 22) may comprise configuring the WD 22 to perform certain measurements on certain subframes or radio resources and reporting such measurements according to embodiments of the present disclosure.

A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block.

In addition, some embodiments may include one or more of the following:

Embodiment A1. A network node configured to communicate with a wireless device (WD), the network node configured to, and/or comprising a radio interface and/or comprising processing circuitry configured to:

transmit an indication of a resource allocation to the WD; and receive, from the WD, an uplink communication with a center frequency corresponding to one of a center frequency of a resource allocated by the transmitted indication of the resource allocation and an edge of an allowed center frequency range.

Embodiment A2. The network node of Embodiment A1, wherein at least one of the indication of the resource allocation is a Resource Indication Value (RIV) and the resource allocated is a resource block corresponding to an uplink channel.

Embodiment A3. The network node of Embodiment A2, wherein the allowed center frequency range is one of a cell channel bandwidth range and a cell transmission bandwidth configuration range.

Embodiment B1. A method implemented in a network node, the method comprising:

transmitting an indication of a resource allocation to the WD; and receiving, from the WD, an uplink communication with a center frequency corresponding to one of a center frequency of a resource allocated by the transmitted indication of the resource allocation and an edge of an allowed center frequency range.

Embodiment B2. The method of Embodiment B1, wherein at least one of the indication of the resource allocation is a Resource Indication Value (RIV) and the resource allocated is a resource block corresponding to an uplink channel.

Embodiment B3. The method of Embodiment B2, wherein the allowed center frequency range is one of a cell channel bandwidth range and a cell transmission bandwidth configuration range.

Embodiment C1. A wireless device (WD) configured to communicate with a network node, the WD configured to, and/or comprising a radio interface and/or processing circuitry configured to:

receive an indication of a resource allocation from the network node; and determine an uplink center frequency based at least on a center frequency of a resource allocated by the received indication of the resource allocation.

Embodiment C2. The WD of Embodiment C1, wherein at least one of the indication of the resource allocation is a Resource Indication Value (RIV) and the resource is a resource block corresponding to an uplink channel.

Embodiment C3. The WD of any of Embodiments C1 and C2, wherein the WD is further configured to transmit uplink information according to the determined uplink center frequency.

Embodiment C4. The WD of any of Embodiments C1-C3, wherein the WD is configured to determine the uplink center frequency based at least on the center frequency of the resource allocated by the received indication of the resource allocation by being further configured to at least one of:

determine whether the center frequency of the resource is outside of an allowed center frequency range;

if the center frequency of the resource is not outside of the allowed center frequency range, configure the uplink center frequency to be the center frequency of the resource; and if the center frequency of the source is outside of the allowed center frequency range, configure the uplink center frequency to be an edge of the allowed center frequency range.

Embodiment C5. The WD of any of Embodiments C1-C3, wherein the WD is configured to determine the uplink center frequency based at least on the center frequency of the resource allocated by the received indication of the resource allocation by being further configured to at least one of:

determine at least one possible center frequency based on a hardware capability of the WD;

determine whether the center frequency of the resource is outside of an allowed center frequency range;

if the center frequency of the resource is not outside of the allowed center frequency range, configure the uplink center frequency to be a nearest one of the determined at least one possible center frequency to the center frequency of the resource; and if the center frequency of the source is outside of the allowed center frequency range, configure the uplink center frequency to be a nearest one of the determined at least one possible center frequency to an edge of the allowed center frequency range.

Embodiment C6. The WD of any of Embodiments C4 and C5, wherein the allowed center frequency range is one of a cell channel bandwidth range and a cell transmission bandwidth configuration range.

Embodiment D1. A method implemented in a wireless device (WD), the method comprising:

receiving an indication of a resource allocation from the network node; and determining an uplink center frequency based at least on a center frequency of a resource allocated by the received indication of the resource allocation.

Embodiment D2. The method of Embodiment D1, wherein at least one of the indication of the resource allocation is a Resource Indication Value (RIV) and the resource is a resource block corresponding to an uplink channel.

Embodiment D3. The method of any of Embodiments D1 and D2, further comprising transmitting uplink information according to the determined uplink center frequency.

Embodiment D4. The method of any of Embodiments D1-D3, wherein determining the uplink center frequency based at least on the center frequency of the resource allocated by the received indication of the resource allocation further comprises to at least one of:

determining whether the center frequency of the resource is outside of an allowed center frequency range;

if the center frequency of the resource is not outside of the allowed center frequency range, configuring the uplink center frequency to be the center frequency of the resource; and if the center frequency of the source is outside of the allowed center frequency range, configuring the uplink center frequency to be an edge of the allowed center frequency range.

Embodiment D5. The method of any of Embodiments D1-D3, wherein determining the uplink center frequency based at least on the center frequency of the resource allocated by the received indication of the resource allocation further comprises to at least one of:

determining at least one possible center frequency based on a hardware capability of the WD;

determining whether the center frequency of the resource is outside of an allowed center frequency range;

if the center frequency of the resource is not outside of the allowed center frequency range, configuring the uplink center frequency to be a nearest one of the determined at least one possible center frequency to the center frequency of the resource; and if the center frequency of the source is outside of the allowed center frequency range, configuring the uplink center frequency to be a nearest one of the determined at least one possible center frequency to an edge of the allowed center frequency range.

Embodiment D6. The method of any of Embodiments D4 and D5, wherein the allowed center frequency range is one of a cell channel bandwidth range and a cell transmission bandwidth configuration range.

According to one aspect, a network node configured to communicate with a wireless device (WD) is provided. According to this aspect, the network node configured to, and/or comprising a radio interface and/or comprising processing circuitry configured to transmit an indication of a resource allocation to the WD; and receive, from the WD, an uplink communication with a center frequency corresponding to one of a center frequency of a resource allocated by the transmitted indication of the resource allocation and an edge of an allowed center frequency range.

According to another aspect, a method implemented in a network node is provided. The method comprises transmitting an indication of a resource allocation to the WD; and receiving, from the WD, an uplink communication with a center frequency corresponding to one of a center frequency of a resource allocated by the transmitted indication of the resource allocation and an edge of an allowed center frequency range.

According to yet another aspect, a wireless device (WD) configured to communicate with a network node is provided. The WD is configured to, and/or comprising a radio interface and/or processing circuitry configured to: receive an indication of a resource allocation from the network node; and determine an uplink center frequency based at least on a center frequency of a resource allocated by the received indication of the resource allocation.

According to yet another aspect, a method implemented in a wireless device (WD) is provided. The method comprises receiving an indication of a resource allocation from the network node; and determining an uplink center frequency based at least on a center frequency of a resource allocated by the received indication of the resource allocation.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device, WD, configured to communicate with a network node, the WD comprising processing circuitry configured to:
   receive an indication of a resource allocation from the network node;
   determine an uplink center frequency based at least in part on a center frequency of a resource allocated by the received indication of the resource allocation such that when the center frequency of the allocated resource is outside an allowed center frequency range, the uplink center frequency is determined to be at an edge of the allowed center frequency range; and
   transmit uplink information according to the determined uplink center frequency.

2. A method in a wireless device, WD, the method comprising:
   receiving an indication of a resource allocation from a network node;
   determining an uplink center frequency based at least in part on a center frequency of a resource allocated by the received indication of the resource allocation such that when the center frequency of the allocated resource is outside an allowed center frequency range, the uplink center frequency is determined to be at an edge of the allowed center frequency range; and transmitting uplink information according to the determined uplink center frequency.

3. The method of claim 2, wherein the WD is a narrowband-Internet of Things, NB-IoT, device.

4. The method of claim 3, wherein the resource allocation corresponds to a narrowband allocation.

5. The method of claim 3, wherein determining the uplink center frequency based at least in part on the center frequency of the resource allocated by the received indication of the resource allocation further comprises:

when the center frequency of the resource is not outside of the allowed center frequency range, configuring the uplink center frequency to be the center frequency of the resource; and when the center frequency of the resource is outside of the allowed center frequency range, configuring the uplink center frequency to be an edge of the allowed center frequency range.

6. The method of claim 2, wherein the resource allocation corresponds to a narrowband allocation.

7. The method of claim 2, wherein the resource is a resource block corresponding to an uplink channel.

8. The method of claim 2, wherein at least one of the indication of the resource allocation is a Resource Indication Value, RIV.

9. The method of claim 2, wherein determining the uplink center frequency based at least in part on the center frequency of the resource allocated by the received indication of the resource allocation further comprises:

determining at least one possible center frequency based on a hardware capability of the WD;

when the center frequency of the resource is not outside of the allowed center frequency range, configuring the uplink center frequency to be a nearest one of the determined at least one possible center frequency to the center frequency of the resource; and when the center frequency of the resource is outside of the allowed center frequency range, configuring the uplink center frequency to be a nearest one of the determined at least one possible center frequency to an edge of the allowed center frequency range.

10. The method of claim 2, wherein the allowed center frequency range is one of a cell channel bandwidth range and a cell transmission bandwidth configuration range.

11. A network node configured to communicate with a wireless device, WD, the network node comprising processing circuitry configured to:

configure the WD by transmitting an indication of a resource allocation to the WD; and receive, from the WD, an uplink communication having a center frequency, the center frequency of the uplink communication based at least in part on a center frequency of a resource allocated by the transmitted indication of the resource allocation such that when the center frequency of the allocated resource is outside an allowed center frequency range, the uplink center frequency is determined to be at an edge of the allowed center frequency range.

12. A method in a network node, the method comprising:

configuring a wireless, WD, by transmitting an indication of a resource allocation to the WD; and receiving, from the WD, an uplink communication having a center frequency, the center frequency of the uplink communication based at least in part on a center frequency of a resource allocated by the transmitted indication of the resource allocation such that when the center frequency of the allocated resource is outside an allowed center frequency range, the uplink center frequency is determined to be at an edge of the allowed center frequency range.

13. The method of claim 12, wherein the WD is a narrowband-Internet of Things, NB-IoT, device.

14. The method of claim 12, wherein the resource allocation corresponds to a narrowband allocation.

15. The method of claim 12, wherein the resource is a resource block corresponding to an uplink channel.

16. The method of claim 12, wherein at least one of the indication of the resource allocation is a Resource Indication Value, RIV.

17. The method of claim 12, wherein the center frequency of the uplink communication is further based at least in part on the allowed center frequency range.

18. The method of claim 17, wherein the allowed center frequency range is one of a cell channel bandwidth range and a cell transmission bandwidth configuration range.

19. The method of claim 12, wherein the center frequency of the uplink communication is further based at least in part on a hardware capability of the WD.

* * * * *